United States Patent [19]

Chang et al.

[11] Patent Number: 4,571,173

[45] Date of Patent: Feb. 18, 1986

[54] METHOD FOR THERMALLY CONDITIONING A THERMOPLASTIC PREFORM

[75] Inventors: Long F. Chang, Sylvania; Scott W. Steele, Toledo, both of Ohio

[73] Assignee: Owens-Illinois, Inc., Toledo, Ohio

[21] Appl. No.: 652,244

[22] Filed: Sep. 20, 1984

Related U.S. Application Data

[63] Continuation of Ser. No. 378,166, May 14, 1982, abandoned.

[51] Int. Cl.[4] .......................... F27B 9/12; B29C 17/07
[52] U.S. Cl. ......................................... 432/9; 264/520; 264/521; 264/532; 264/535; 425/526; 432/11
[58] Field of Search ............... 264/519, 520, 521, 532, 264/535; 425/526; 432/11, 9, 10; 219/388

[56] References Cited

U.S. PATENT DOCUMENTS

| | | | |
|---|---|---|---|
| 3,445,096 | 5/1969 | Seefluth | 432/11 |
| 4,025,294 | 5/1977 | Daane et al. | 432/11 |
| 4,036,927 | 7/1977 | Stolki | 264/535 X |
| 4,382,905 | 5/1983 | Valyi | 264/537 X |
| 4,407,651 | 10/1983 | Beck et al. | 432/11 |

*Primary Examiner*—Jan Silbaugh
*Attorney, Agent, or Firm*—Philip M. Rice

[57] ABSTRACT

A method is disclosed for thermally conditioning an essentially tubular parison of polyethylene terephthalate material to a desired orientation temperature at which the polyethylene terephthalate material can be biaxially stretched. The method comprises the steps of heating the parison by applying heat to the exterior surface thereof until the surface reaches a maximum heating temperature less than the temperature at which the polyethylene terephthalate material begins to crystalize and then cooling the heated exterior surface of the parison to remove the heat therefrom while the heat within the wall of the parison diffuses therethrough to raise the temperature of the opposing interior surface toward the desired orientation temperature. The method further includes the subsequent steps of reheating the parison by applying heat to the cooled exterior surface thereof until the surface reaches a temperature no higher than the maximum heating temperature to again add heat within the wall of the parison and then recooling the reheated exterior surface of the parison to again remove the heat therefrom until the additional heat within the wall of the parison diffuses therethrough to further raise the temperature of the opposing interior surface to approximately the desired orientation temperature so that the temperature through the wall of the parison is substantially uniform from the reheated exterior surface to the opposing interior surface.

18 Claims, 5 Drawing Figures

RADIAL TEMPERATURE PROFILE ACROSS WALL OF PARISON
AT TIME (t1)-(t5) DURING THERMAL CONDITIONING CYCLE

RADIAL TEMPERATURE PROFILE ACROSS WALL OF PARISON
AT TIME (t1)-(t5) DURING THERMAL CONDITIONING CYCLE

METHOD FOR THERMALLY CONDITIONING A THERMOPLASTIC PREFORM

This is a continuation, of application Ser. No. 378,166 filed May 14, 1982, now abandoned.

FIELD OF THE INVENTION

This invention relates to steps for thermally conditioning a thermoplastic preform, and more particularly to a method for thermally conditioning an essentially tubular parison of polyethylene terephthalate material prior to a blow molding operation.

BACKGROUND OF THE INVENTION

Thermoplastic parisons are heated prior to a blow molding operation by placing them in thermal proximity to a heating device such as, for example, a tungsten heating element housed in a quartz evelope which emits short wave infrared radiation to penetrate the parisons. A significant drawback in using an infrared energy source is that the impinging radiation does not evenly penetrate the wall of the parison. Thus, it became necessary to extend the amount of time that the parison is exposed to the heating element to adequately heat the wall of the parison all the way through to the interior surface of the parison. However, this solution creates several other problems. First, the extended exposure often causes the exterior surface of the parison to overheat. This is unacceptable for many types of materials, such as, for example, polyethylene terephthalate (PET) which crystalizes at elevated temperatures. Second, a relatively high temperature differential or gradient is established across the wall of the parison and is an undesirable condition for the blow molding operation. Third, the cycle time required for the entire blow molding operation is increased. Several attempts have been made to overcome these problems. One such method includes simultaneously heating and cooling a parison as disclosed in U.S. Pat. No. 4,076,071 granted on Feb. 28, 1978, to O. Rosenkranz, et al. The parison is heated while passing adjacent an infrared heating device and simultaneously cooled by coolant forced between the heater and the parison. Another method disclosed in U.S. Pat. No. 4,079,104 granted on Mar. 14, 1978 to A. C. Dickson, et al., includes simultaneous heating and cooling wherein a coolant impinges directly on the heating elements and then on the parison surface. Both of these solutions have introduced new problems inherent in apparatus for simultaneously heating and cooling. Not only is such apparatus more costly, but also more difficult to control and maintain.

SUMMARY OF THE INVENTION

The instant invention is based on the discovery of a method for thermally conditioning a thermoplastic preform, and more particularly a method for thermally conditioning an essentially tubular parison of polyethylene terephthalate (PET) material prior to a blow molding operation. The method involves thermal conditioning an essentially tubular parison of PET material to a desired orientation temperature at which the PET material can be biaxially stretched. The method comprises the steps of heating the parison by applying heat to the exterior surface thereof until the surface reaches a maximum heating temperature less than the temperature at which the PET material begins to crystalize and then cooling the heated exterior surface to remove the heat therefrom while the heat within the wall of the parison diffuses therethrough to raise the temperature of the opposing interior surface toward the desired orientation temperature. The method further includes subsequent steps of reheating the parison by applying heat to the cooled exterior surface thereof until the surface reaches a temperature no higher than the maximum heating temperature to again add heat within the wall of the parison and then recooling the reheated exterior surface of the parison to again remove the heat therefrom until the additional heat within the wall of the parison diffuses therethrough to further raise the temperature of the opposing interior surface to approximately the desired orientation temperature so that the temperature through the wall of the parison is substantially uniform from the reheated exterior surface to the opposing interior surface. Thus, the temperature of the heated exterior surface substantially equilibrates with the temperature of the opposing interior surface at approximately the desired orientation temperature. An object of the present invention is to thermally condition the parison by alternate heating and cooling steps rather than by simultaneous heating and cooling steps as suggested by the methods described above. As a result, the exterior surface of the parison is not overheated and the temperature gradients equilibrate to a substantially uniform temperature across the thickness of the wall of the parison. Furthermore, the amount of time required to thermally condition the parison to a uniform temperature is greatly reduced so that the cycle time required for the entire blow molding operation is decreased. Moreover this mode of thermal conditioning substantially simplifies the physical structure of the apparatus and also makes it easier to control the heating and cooling steps.

DETAILED DESCRIPTION OF THE INVENTION

Figure 1:
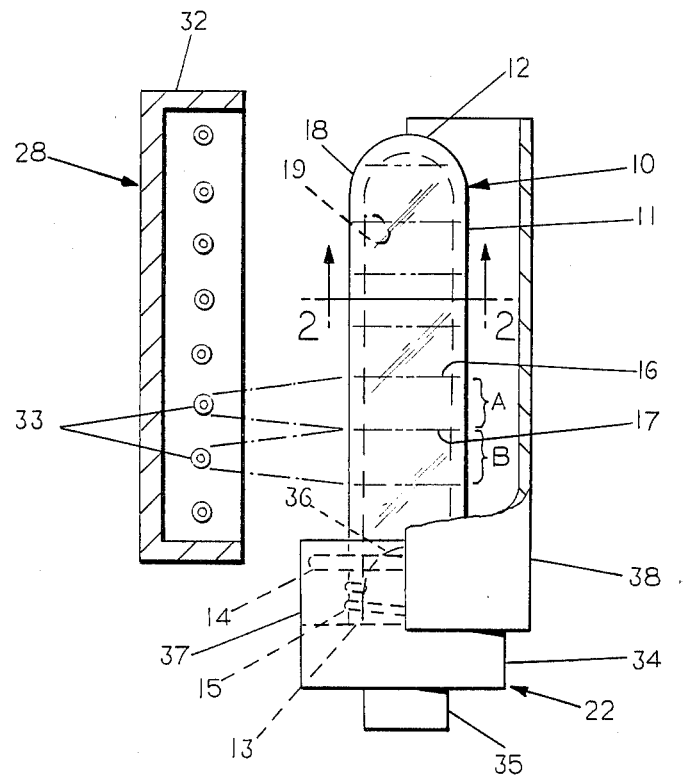
FIG. 1 is a partially schematic, vertical sectional view of a parison and a heating box of FIG. 3 taken along the line 1—1.

The present invention generally deals with a method for thermally conditioning a thermoplastic preform having opposing surfaces to a desired orientation temperature at which the thermoplastic material can be biaxially stretched. More specifically, the invention deals with a method for thermally conditioning an essentially tubular parison of polyethylene terephthalate (PET) in a radial direction across the thickness of its wall to a desired orientation temperature at which the PET material can be biaxially deformed. Referring now in more detail to FIG. 1, an essentially tubular parison is shown at 10 and comprises a main body 11 which closes to a bottom 12 and opers to an orifice 13. The parison 10 further comprises a finish having a ledge 14 circumventing the parison 10 near its opened end and a threaded neck 15 between the ledge 14 and the orifice 13.

Figure 2:
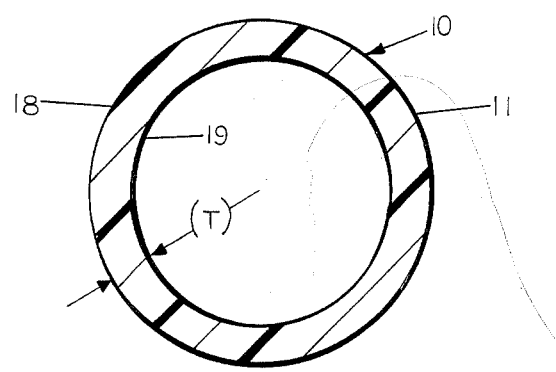
FIG. 2 is a partially schematic, horizontal sectional view of the parison of FIG. 1 taken along the line 2—2.

The hoop dimension of the parison 10 refers to the circumferential measurement around the main body 11 of the parison 10. A hoop zone of the parison 10 refers to a circumferential surface area around the main body 11 between any two planes cutting through the main body 11 in a radial direction, such as the hoop zone A between the planes indicated by broken lines 16 and 17. Referring more specifically to FIG. 2, the thickness (T) of the wall of the main body 11 of the parison 10 extends in a radial direction from an exterior surface 18 to an opposing interior surface 19. As stated above, the invention deals with a method for thermally conditioning the parison 10 in a radial direction throughout the thickness (T) of the wall of the main body 11 to a desired orientation temperature substantially uniform from the exterior surface 18 to the opposing interior surface 19. The desired orientation temperature is the temperature at which the PET material can be biaxially stretched and molecularly oriented. Therefore, it is to be understood, that the invention is directed to a method for controlling the radial temperature profile across the thickness (T) of the wall of the main body 11 for a specific hoop zone. This is to be distinguished from a method for controlling the axial temperature profile across all the hoop zones of the parison 10. It is also to be understood that while the object of this method is to heat the wall of the parison 10, the steps described will be in terms of heating and cooling the exterior surface 18 and the interior surface 19 to more easily explain the thermal conditioning process.

Figure 3:
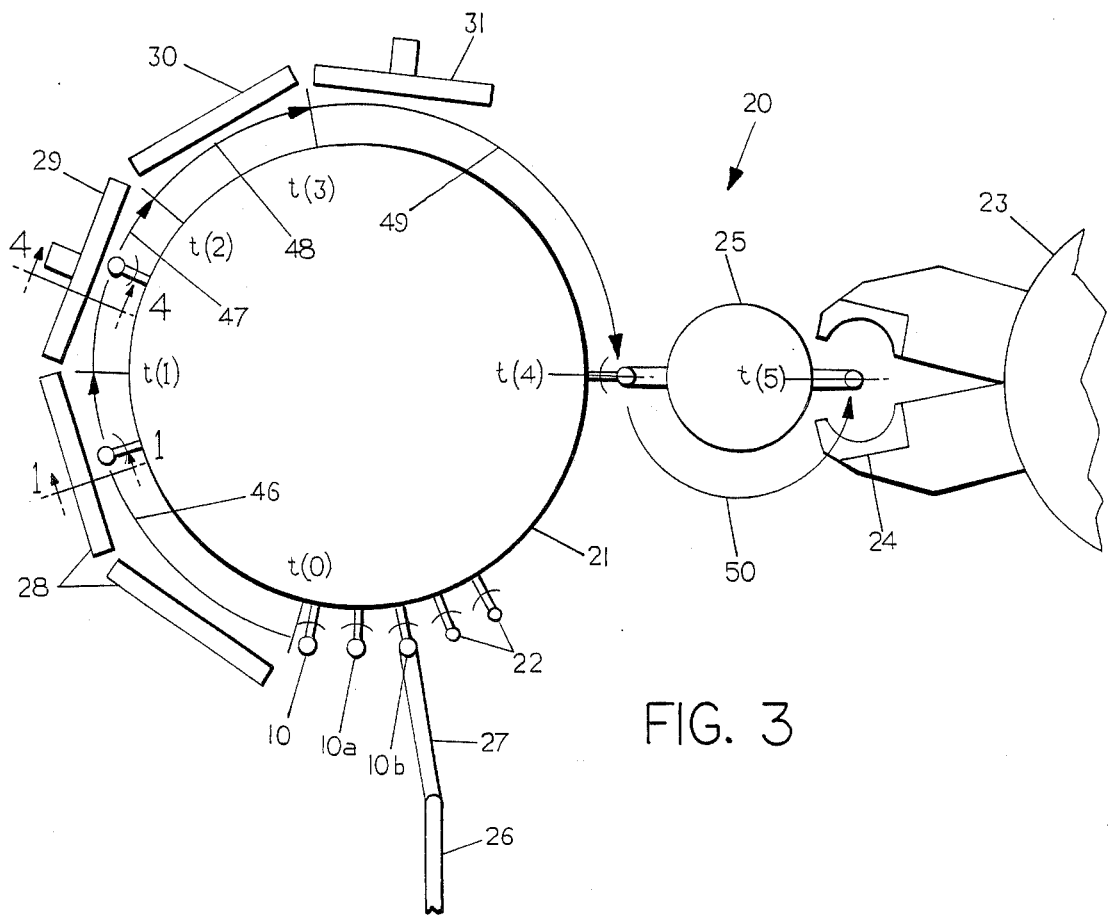
FIG. 3 is a partially schematic, horizontal view of blow molding apparatus for practising the method in accordance with the invention.

The method according to the invention is accomplished in a blow molding machine such as that shown schematically in FIG. 3 at 20. The blow molding machine 20 comprises a heating wheel 21 which supports a plurality of axially extending mandrels 22, a blowing wheel 23 which axially supports a mold 24 for forming the parison 10 into a bottle, and a transfer wheel 25 for moving the heated parison 10 from one of the mandrels 22 of the heating wheel 21 and positioning it in the mold 24 of the blowing wheel 23. The molding machine 20 also comprises a feeding conveyor 26 which guides the parison 10 to a loading station 27 at which it is placed on one of the mandrels 22 of the heating wheel 21. A plurality of parisons 10a, 10b, etc., are successively positioned on the mandrels 22 at the loading station as the heating wheel 21 rotates in a clockwise direction. The molding machine 20 further comprises a bank of heating, cooling, reheating and recooling boxes, 28, 29, 30 and 31 respectively, positioned circumferentially around the heating wheel 21 so that each one is in heat exchange proximity with the parisons 10, 10a, and 10b as they are rotated by the heating wheel 21.

Referring back to FIG. 1, the parison 10 is shown positioned on one of the mandrels 22 in heat transfer proximity to one of the heating boxes 28. The heating box 28 comprises a box-shaped frame 32 which houses a plurality of horizontally mounted infrared heating elements 33. Each of the heating elements 33 consists of a tungsten filament encased within a quartz tube and provides an infrared wave length set to penetrate the wall thickness (T) of the parison 10. For PET material, the maxiumum wavelength for optimum penetration characteristics is approximately 1.0 micron. The heating elements 33 provide a spectral energy peak wave length of about 1.2 microns at 100% output. The heating elements 33 are commercially available from Research Inc. under the name Pyropanel and are apparently manufactured under U.S. Pat. No. 3,436,524 hereby incorporated by reference. The heating elements 33 in the commercially available Pryopanel are normally wired in parallel, but have been modified to provide a separate heat control (not shown) for each heating element 33 as described in U.S. Pat. Nos. 4,079,104 and 4,147,487 which are hereby incorporated by reference. By varying the separate heat controls, the power for each heating element 33 is individually controlled to apply a predetermined amount of radiant heat energy to corresponding hoop zones such as those indicated by A and B. Thus, the energy output for each element is adjusted to achieve a desired axial temperature profile for the parison 10 as best suited for the subsequent blow molding steps. However, it is to be understood that the scope of this invention is directed to thermally conditioning the parison 10 in a radial direction across the thickness (T) of the wall of its main body 11 to a desired orientation temperature from its exterior surface 18 to its opposing interior surface 19 to establish a substantially uniform radial temperature profile for each hoop zone.

The parison 10 is conveyed past the heating box 28 on one of the mandrels 22 which comprises a base 34 supported on a journel 35, and a stud 36 extending from the base 34 into the finish of the parison 10. The mandrels 22 are rotated as they are conveyed past the heating box 28 in order to expose the entire surface area of each hoop zone of the parison 10 to the heating elements 33. The rotational movement may be effected by a gear sprocket (not shown) on the base 34 of the mandrel 22 which engages a stationary rack (not shown). Alternatively, a frictional pulley element (not shown) may be used to engage a groove (not shown) on the journal 35. In either case, the mandrels 22 can be moved in a lateral direction, either closer or farther from the heating box 28, by a conventional transfer mechanism (not shown), such as that shown in U.S. Pat. No. 3,599,280, incorporated by reference herein. The transfer mechanism does not form a part of this invention and therefore is not illustrated. A tubular shield 37 is connected to the base 34 and extends upwardly therefrom to cover the ledge 14 and neck 15 of the parison 10 so that both are protected from the infrared radiation generated by the heating elements 33. In addition, an optional semi-cylindrical reflector 38 can be used to reflect the infrared radiation from the heating elements 33 onto the unexposed exterior surface 18 of the parison 10. The reheating box 30 is similar in construction to that of the heating box 28.

Figure 4:
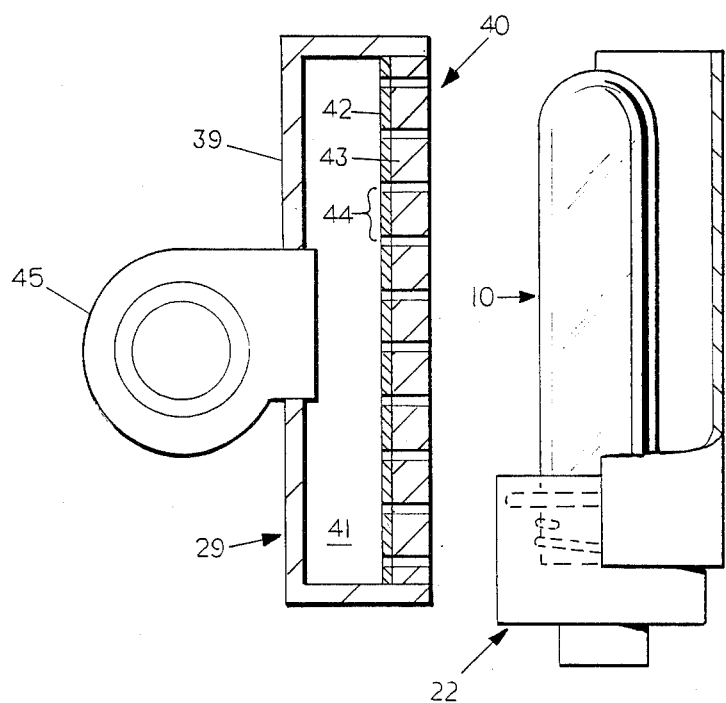
FIG. 4 is a partially schematic, vertical sectional view of a parison and a cooling box of FIG. 3 taken along the line 4—4.

Referring to FIG. 4, the parison 10 is shown positioned on one of the mandrels 22 in heat transfer proximity to the cooling box 29. The cooling box 29 comprises a box-shaped frame 39 and a panel 40 which closes the frame 39 to form a plenum 41. The panel 40 comprises a steel backing member 42 and a refractory material 43 such as ceramic. A plurality of air delivery ports 44 extend through the panel 40 of the cooling box 29. Air under pressure is delivered to the plenum 41 by a fan 45 of conventional design and directed from the plenum 41 through the air delivery ports 44 against the parison 10. The delivery ports 44 are horizontally extending slots which are aligned like the heating elements 33 to cool corresponding hoop zones of the parison 10 while being rotated on the mandrel 22. The air is forced against the exterior surface 18 (FIG. 2) of the parison 10 to remove the heat therefrom while the heat within the wall of the parison 10 diffuses therethrough to raise the temperature at the opposing interior surface 19 toward the desired orientation temperature. The desired amount of temperature equilibration is achieved by controlling the rate and duration of air flow directed against the parison 10. The recooling box 31 is constructed in a similar fashion to that of the cooling box 29.

Figure 5:
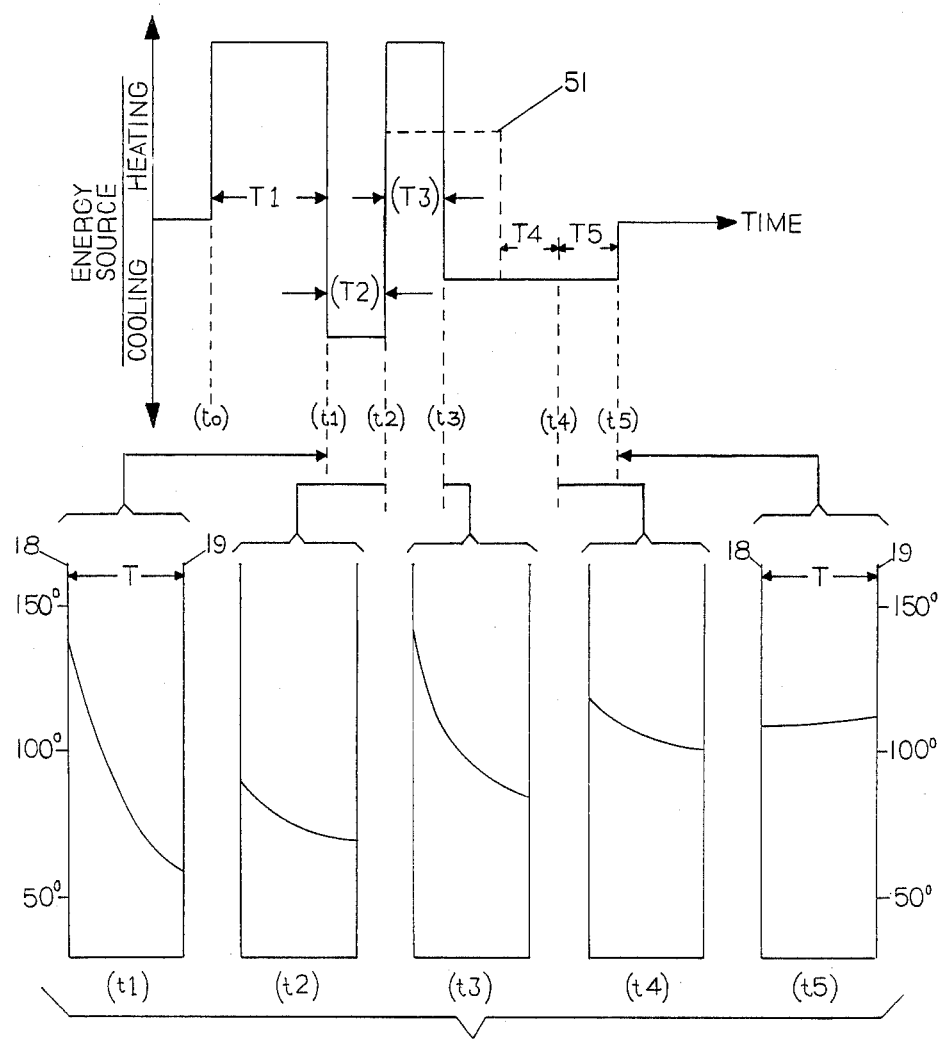
FIG. 5 is a graph of heating and cooling cycles of an energy source over time and corresponding temperature profiles of a parison after each cycle in accordance with the invention.

In operation, the parison 10 (FIG. 3) is placed on one of the mandrels 22 at the loading station 27 and then conveyed by the heating wheel 21 along a predetermined path identified by arrows 46, 47, 48 and 49. The parison 10 is then conveyed by the transfer wheel 25 to the mold 24 of the blowing wheel 23 along a path identified by an arrow 50. Each arrow corresponds to a portion of the path along which the parison 10 is subjected to either a heating or cooling cycle. Thus, the parison 10 is subjected to a heating step from time t(0) to t(1) for a time period T(1) when conveyed along the path 46 in thermal proximity to the heating boxes 28, a cooling step from time t(1) to t(2) for a time period T(2) when conveyed along the path 47 in thermal proximity to the cooling box 29, and a reheating step from time t(2) to t(3) for a time period T(3) when conveyed along the path 48 in thermal proximity to the reheating box 30. The parison 10 is subjected to a recooling step from time t(3) to t(4) for a time period T(4) when conveyed along the path 49 in thermal proximity to the cooling box 31 and then after the recooling box 31 as it rotates and moves to the transfer wheel 25, and from time t(4) to t(5) for a time period T(5) when conveyed along the path 50 from the tranfer wheel 25 to the blowing wheel 23. As can be seen, the time periods T(1), T(2), T(3) and T(4) are increased or decreased uniformly by controlling the rate of rotation of the heating wheel 21; the time period T(5) is increased or decreased by controlling the rate of rotation of the transfer wheel 25. The first four time periods are individually increased or decreased by appropriately sizing the boxes 28, 29, 30 and 31. FIG. 5 is a graph of the heating and cooling steps or cycle just described as a a function of time and the radial temperature profile of the parison 10 across the thickness (T) of its wall from the heated exterior surface 18 to the opposing interior surface 19 after each cycle at times t(1), t(2), t(3), t(4) and t(5).

When heating a parison 10 made of PET material, for which this invention was primarily developed, it is desirable to heat the parison 10 from a substantially uniform temperature of about 50° C. to a desired orientation temperature of about 110° C. The desired orientation temperature typically falls into a range of about 90° C. to about 120° C. The heating step comprises heating the exterior surface 18 of the parison 10 to a maximum temperature greater than the desired orientation temperature but less than the temperature at which the PET material begins to crystalize. Although crystalization occurs over a range of temperatures from about 130° C. to about 180° C., significant crystalization begins to occur in PET material at a temperature of about 150° C. as disclosed by U.S. Pat. No. 4,150,079 which is hereby incorporated by reference. At time t(0) the temperature of the parison 10 is substantially uniform at about 50° C. During the time period T(1), most of the radiant heat energy applied to the exterior surface 18 of the parison 10 diffuses through the thickness (T) of the wall of the parison 10 and some penetrates therethrough depending on the infrared absorption characteristics of the PET material and the frequency setting of the heating elements 33. The duration of the time period T(1) is set so that the temperature of the exterior surface 18 of the parison 10 at time t(1) is approximately 150° C. Therefore, at time t(1) the radial temperature profile across the thickness (T) of the wall of the parison 10 extends from approximately 150° C. at the exterior surface 18 to approximately 60° C. at the opposing interior surface 19 of the parison 10.

During the cooling period T(2), air is forced against the exterior surface 18 of the parison 10 to remove the heat therefrom while the heat within the wall of the parison 10 further diffuses therethrough to raise the temperature at the opposing interior surface 19 toward the desired orientation temperature. The cooling period T(2) is typically less than that of the heating period T(1). In the preferred embodiment of the invention, the cooling period T(2) is approximately half that of the heating period T(1). After the cooling period T(2) at time t(2), the radial temperature profile through the wall of the parison 10 has substantially equilibrated so that the temperature of the exterior surface 18 of the parison 10 has dropped to approximately 90° C. while the heat within the wall of the parison 10 has diffused therethrough to raise the temperature at the opposing interior surface to approximately 70° C.

During the reheating period T(3), the cooled exterior surface 18 of the parison 10 is again heated to a temperature no higher than the maximum heating temperature to again add more heat within the wall of the parison 10. Since the temperature of the exterior surface 18 after the cooling cycle T(2) is now higher (approximately 90° C. at time t(2)), the reheating period T(3) must be less than that of the heating period T(1) so that the temperature of the exterior surface 18 does not exceed the maximum heating temperature. In the preferred embodiment of the invention, the reheating period T(3) is approximately half that of the heating period T(1). During the reheating step, the heat within the wall of the parison 10 continues to diffuse toward the opposing interior surface 19 while the infrared radiation continues to penetrate therethrough to raise the temperature at the opposing interior surface 19 to approximately 85° C. at time t(3). Therefore, the radial temperature profile at time t(3) illustrates a temperature gradient across the thickness (T) of its wall from a temperature of approximately 140° C. at the exterior surface 18 to approximately 85° C. at the opposing interior surface 19. It is to be understood, however, that reheating to the maximum heating temperature can alternatively be accomplished by applying a lesser amount of radiant heat energy to the cooled exterior surface 18 of the parison 10 for a longer period of time as indicated by a dash line 51 to accomplish the same result.

During the recooling period T(4) and T(5), the reheated exterior surface 18 of the parison 10 is again cooled to again remove heat therefrom until the additional heat within the wall of the parison 10 diffuses therethrough to further raise the temperature of the opposing interior surface 19 to approximately the desired orientation temperature. Although a recooling box 31 is shown in FIG. 3, the preferred embodiment of the method does not rely on a recooling box, but rather the rotational and translational motion along the paths 49 and 50. During that portion of the recooling step defined by the time period T(4), the temperature through the thickness (T) of the wall of the parison 10 further equilibrates to lower the temperature of the exterior surface 18 to approximately 120° C. and raise the temperature at the opposing interior surface 19 to approximately 100° C. as illustrated in the radial temperature profile taken at time t(4). During the time period T(5), the temperature across the thickness (T) of the wall of the parison 10 equilibrates further such that the temperature through the wall of the parison 10 is substantially uniform at approximately 110° C. from the reheated exterior surface 18 to the opposing interior surface 19. In fact, the temperature of the interior surface 19 will be slightly higher than that of the exterior surface 18 because the interior surface 19 forms a space within the body 11 of the parison 10 which retains heat while the exterior surface 18 is slightly cooled by the ambient air to which it is exposed as the parison 10 is conveyed along the path 50. If additional recooling is required to achieve the radial temperature profile illustrated at time t(5), the recooling box 31 is employed.

It will be apparent that various changes may be made in the details of the steps from those shown in the attached drawings and discussed in conjunction therewith without departing from the spirit and scope of this invention as defined in the appended claims. For all practical purposes, a thermoplastic preform of any shape can be thermally conditioned from one side in accordance with the invention. Furthermore, additional heating and cooling steps can be incorporated into the thermal conditioning cycle as the particular blow molding operation might require. It is, therefore, to be understood that this invention is not to be limited to the specific details shown and described.

What we claim is:

1. A method for thermally conditioning a crystallizable thermoplastic preform having opposing surfaces to a desired orientation temperature at which the thermoplastic material can be biaxially stretched, comprising the steps of:
   (a) heating the preform by applying heat to an exterior surface thereof as shown in the heating period T1 in FIG. 5 until the surface reaches a maximum heating temperature less than the temperature at which the thermoplastic material begins to crystalize, the opossing interior surface not reaching the desired orientation temperature;
   (b) cooling quickly in cooling period T2 as shown in FIG. 5 the heated exterior surface to remove the heat therefrom until the temperature of the heated surface substantially equilibrates with the temperature of the opposing surface as shown in time t2 in FIG. 5;
   (c) reheating the preform in reheating period T3 by applying heat to the cooled surface thereof until the surface reaches a temperature no higher than the maximum heating temperature to again add heat within the preform, the opposing interior surface in t3 being higher than in t2 but still not reaching the desired orientation temperature;
   (d) recooling the reheated surface in recooling period T4 to again remove the heat therefrom until the temperature of the heated surface is closer to the temperature of the opposing surface near the desired orientation temperature so that the temperature of the preform becomes substantially more uniform from the reheated surface to the opposing interior surface in period T4 than T3; and
   (e) further recooling in recooling period T5 the exterior surface so that the temperature of the exterior surface substantially equilibrates with the temperature of the opposing surface at the desired orientation temperature as shown in t5.

2. A method for thermally conditioning a crystallizable thermoplastic preform having opposing surfaces to a desired orientation temperature that is equivalent to that of about 90° C. to 120° C. for polyethylene terephthalate at which temperature the thermoplastic material can be biaxially stretched, comprising the steps of:
   (a) heating the preform by applying heat to a surface thereof until the surface reaches a maximum heating temperature greater than the desired orientation temperature but less than the temperature at which the thermoplastic material begins to crystalize, the opposing interior surface not reaching the orientation temperature;
   (b) cooling the heated surface to remove the heat therefrom while the heat within the preform diffuses therethrough to raise the temperature of the opposing surface toward the minimum orientation temperature, the opposing interior surface having a temperature higher than in step (a) but below the desired orientation temperature;
   (c) reheating the preform by applying heat to the cooled surface thereof until the surface reaches a temperature no higher than the maximum heating temperature to again add heat within the preform, the opposing surface temperature being higher than in step (b) but below the final temperature before stretching and orienting; and
   (d) recooling the reheated surface to again remove the heat therefrom until the additional heat within the preform diffuses therethrough to further raise the temperature of the opposing surface to approximately the desired orientation temperature so that the temperature of the preform is substantially uniform from the reheated surface to the opposing interior surface just prior to stretching and orienting.

3. A method as recited in claim 2 further comprising a second pair of reheating and recooling steps necessary to achieve the desired orientation temperature.

4. A method as recited in claim 2 wherein the reheating step is accomplished by applying heat of approximately equal intensity to that applied during the heating step for a period of time shorter than that of the heating step.

5. A method as recited in claim 2 wherein the reheating step is accomplished by applying heat of less intensity than that applied during the heating step for a period of time approximately equal to that of the heating step.

6. A method as recited in claim 2 wherein the recooling step (d) has a period ending when the temperature of the heated surface substantially equilibrates with the temperature of the opposing surface.

7. A method as recited in claim 2 wherein the cooling step (b) and the recooling step (d) is accomplished by forced convection and controlled by varying the rate of a flow of air against the heated surface for a period of time less than that of the heating step.

8. A method as recited in claim 2 wherein the recooling step (d) comprises cooling the reheated surface of the preform to a temperature higher than that of the cooling step for a period of time greater than that of the heating step.

9. A method for thermally conditioning an essentially tubular parison of polyethylene terephthalate material in a radial direction across the thickness of its wall to a desired orientation temperature of about 90° C. to 120° C. at which temperature the polyethylene terephthalate can be biaxially stretched, comprising the steps of:

(a) heating the parison by applying heat to the exterior surface thereof until the surface reaches a maximum heating temperature less than the temperature at which the polyethylene terephthalate material begins to crystalize, the opposing interior surface reaching a temperature less than the orientation temperature;

(b) cooling the heated exterior surface of the parison to remove the heat therefrom while the heat within the wall of the parison diffuses therethrough to raise the temperature of the opposing interior surface toward but below the desired orientation temperature;

(c) reheating the parison by applying heat to the cooled exterior surface thereof until the surface reaches a temperature no higher than the maximum heating temperture to again add heat within the wall of the parison, the temperature of the opposing surface being higher than in step (b); and (d) recooling the reheated exterior surface of the parison to again remove the heat therefrom until the additional heat within the wall of the parison diffuses therethrough to further raise the temperature of the opposing interior surface to approximately the desired orientation temperature so that the temperature through the wall of the parison is substantially uniform from the reheated exterior surface to the opposing interior surface.

10. A method as recited in claim 9 wherein the temperature of the exterior surface in step (a) is about 140° C. and the temperature of the interior surface is about 60° C.

11. A method as recited in claim 9 wherein the reheating step is accomplished by applying heat of approximately equal intensity to that applied during the heating step for a period of time shorter than that of the heating step.

12. A method as recited in claim 9 wherein the reheating step is accomplished by applying heat of less intensity than that applied during the heating step for a period of time approximately equal to that of the heating step.

13. A method as recited in claim 9 wherein the cooling step has a period ending when the temperature of the heated exterior surface substantially equilibrates with the opposing interior surface at a temperature of about 90° C. to 120° C.

14. A method for thermally conditioning an essentially tubular parison of polyethylene terephthalate material in a radial direction across the thickness of its wall to a desired orientation temperature at which the polyethylene terephthalate material can be biaxially stretched, comprising the steps of:

(a) heating the parison as shown by a heating period T1 in FIG. 5 by applying heat to the exterior surface 18 thereof as shown in FIG. 5 until the surface 18 reaches a maximum heating temperature of less than about 150° C. which is less than the temperature at which the polyethylene terephthalate material beings to crystalize, the opposing surface 19 reaching a temperature less than orientation temperature during period T1 as shown in FIG. 5;

(b) cooling the heated exterior surface of the parison in cooling period T2 as shown in FIG. 5 to remove the heat therefrom while the heat within the wall of the parison diffuses therethrough to raise the temperature of the opposing interior surface toward the desired orientation temperature as shown in time t1 and t2 in FIG. 5;

(c) reheating the parison by applying heat to the cooled exterior surface thereof in reheating period T3 until the surface reaches a temperature no higher than the maximum heating temperature shown in time t1 to again add heat within the wall of the parison; and (d) recooling the reheated exterior surface of the parison as shown in period T4 to again remove in the heat therefrom until the additional heat within the wall of the parison diffuses therethrough to further raise the temperature of the opposing interior surface to approximately the desired orientation temperature as shown in time t5 so that the temperature through the wall of the parison is substantially uniform from the reheated exterior surface 18 to the opposing interior surface 19.

15. A method as recited in claim 14 wherein the desired orientation temperature is within a range of about 90° C. to about 120° C., and the maximum temperature of the exterior wall surface 18 is about 140° C., the temperature of the opposing surface 19 being about 60° C. as shown in time t1.

16. A method as recited in claim 14 wherein the cooling step is accomplished by forced convection and controlled by varying the rate of flow of air against the heated exterior surface for a period of time less than that of the heating step.

17. A method as recited in claim 14 wherein the recooling step comprises cooling the reheated exterior surface of the parison to a temperature not as low as that of the cooling step for a period of time greater than that of the heating step.

18. A method as recited in claim 14 wherein the recooling step is accomplished by forced convection and is controlled by varying the rate of a flow of air against the reheated surface for a period of time greater than that of the heating step.

* * * * *